(12) United States Patent
Siehler et al.

(10) Patent No.: US 10,340,668 B2
(45) Date of Patent: Jul. 2, 2019

(54) STACKABLE MODULE

(71) Applicant: H & B ELECTRONIC GMBH & CO. KG, Deckenpfronn (DE)

(72) Inventors: Achim Siehler, Calw (DE); Jan Bayerbach, Calw (DE); Jochen Heimsch, Fellbach (DE)

(73) Assignee: H & B ELECTRONIC GMBH & CO. KG, Deckenpfronn (DE)

( * ) Notice: Subject to any disclaimer, the term of this patent is extended or adjusted under 35 U.S.C. 154(b) by 0 days.

(21) Appl. No.: 15/781,378

(22) PCT Filed: Nov. 28, 2016

(86) PCT No.: PCT/EP2016/078994
§ 371 (c)(1),
(2) Date: Jun. 4, 2018

(87) PCT Pub. No.: WO2017/097622
PCT Pub. Date: Jun. 15, 2017

(65) Prior Publication Data
US 2019/0013652 A1 Jan. 10, 2019

(30) Foreign Application Priority Data
Dec. 8, 2015 (DE) .................. 20 2015 106 673 U

(51) Int. Cl.
*H05K 7/02* (2006.01)
*H05K 7/04* (2006.01)
(Continued)

(52) U.S. Cl.
CPC .......... *H02B 1/052* (2013.01); *H01R 9/2608* (2013.01); *H02B 1/0523* (2013.01)

(58) Field of Classification Search
USPC ........................................ 361/810, 807, 809
See application file for complete search history.

(56) References Cited

U.S. PATENT DOCUMENTS 6,371,435 B1 * 4/2002 Landis ................. H02B 1/052
248/694
7,516,927 B2 * 4/2009 Portal ................ H01R 9/2608
248/221.11
(Continued)

FOREIGN PATENT DOCUMENTS

DE 197 09 811 A1 9/1998
DE 600 32 595 T2 10/2007
(Continued)

OTHER PUBLICATIONS

International Search Report (PCT/ISA/210) issued in PCT/EP2016/078994, dated Feb. 1, 2017.

*Primary Examiner* — Hung S. Bui
(74) *Attorney, Agent, or Firm* — Birch, Stewart, Kolasch & Birch, LLP

(57) ABSTRACT

A stackable module has a housing provided to receive an electric/electronic component, and a clamping device for attachment to a support rail, wherein the clamping device has two latching/gripping hooks, which are displaceable in mutually opposite directions between an open position and a fastening position, and a force deflection mechanism for adjusting the latching/gripping hooks between the open position and the fastening position, said mechanism being actuable by means of an actuating element and able to be subjected to an actuating force from an outer side. In this case, the latching/gripping hooks bound a free opening distance which, for release fastening to the support rail, is greater in the open position and smaller in the fastening position than a provided support rail extent. In this case, provision is made for the force deflection mechanism to have an actuating-element-side deflection profile and a hook-side displacement part, which has a deformation portion which is deformable by a displacement force in order to generate a hook-side displacement, wherein between the (Continued)

Figure 1:
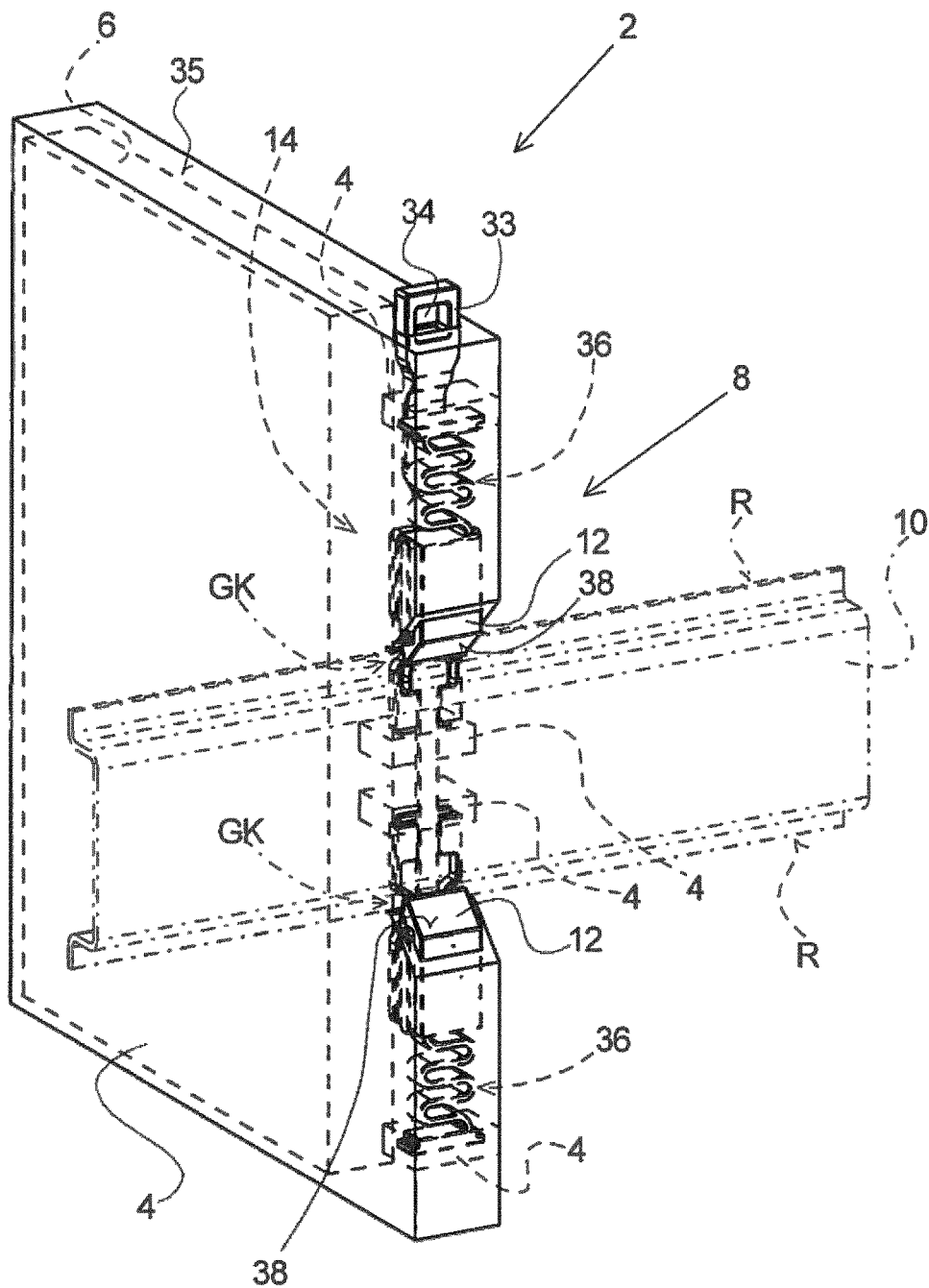

deflection profile and the deformation portion, a sliding contact is able to be formed, at which the deformation portion is able to be subjected to the displacement force via the deflection profile.

21 Claims, 8 Drawing Sheets

(51) Int. Cl.
*H02B 1/052* (2006.01)
*H01R 9/26* (2006.01)

(56) References Cited

U.S. PATENT DOCUMENTS

| | | | |
|---|---|---|---|
| 9,485,879 B2* | 11/2016 | Molnar | H05K 5/0026 |
| 2007/0008708 A1 | 1/2007 | Hanning et al. | |
| 2008/0108248 A1* | 5/2008 | Lim | H02B 1/052 |
| | | | 439/532 |

FOREIGN PATENT DOCUMENTS

| | | |
|---|---|---|
| EP | 1 672 743 A1 | 6/2006 |
| EP | 1 742 315 A1 | 1/2007 |

* cited by examiner

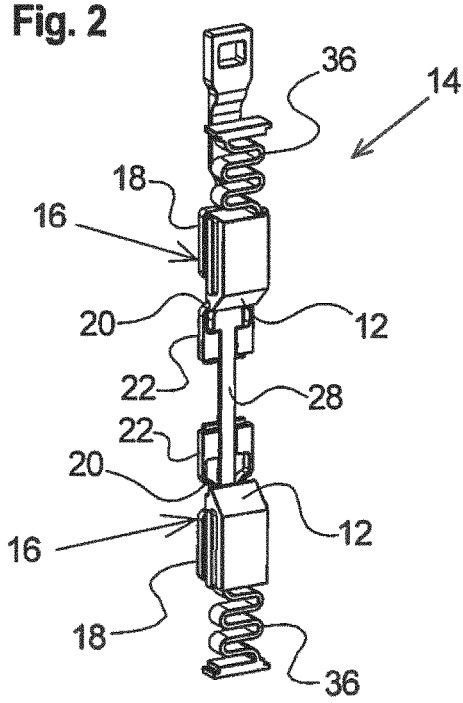
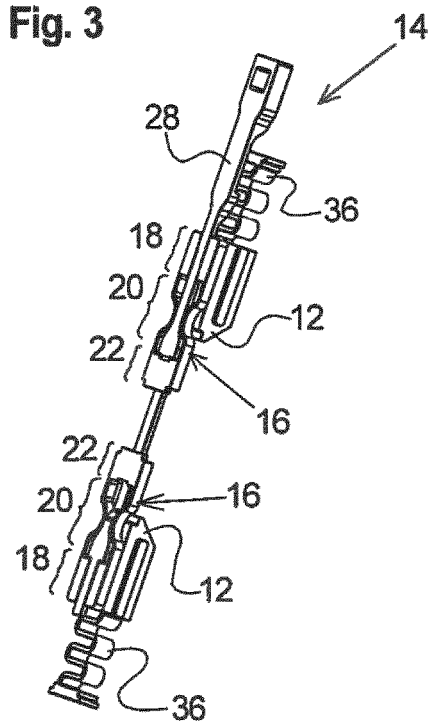
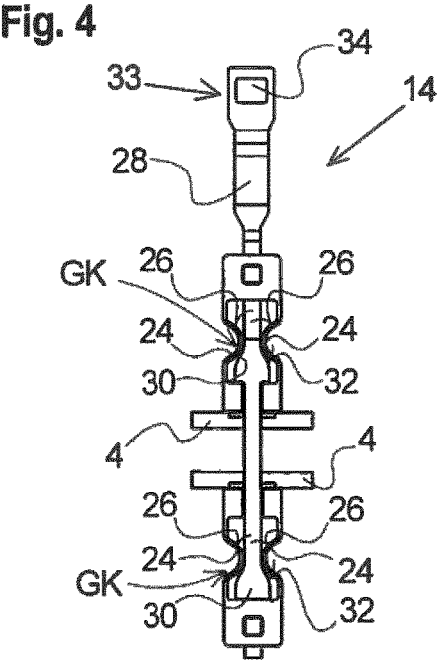
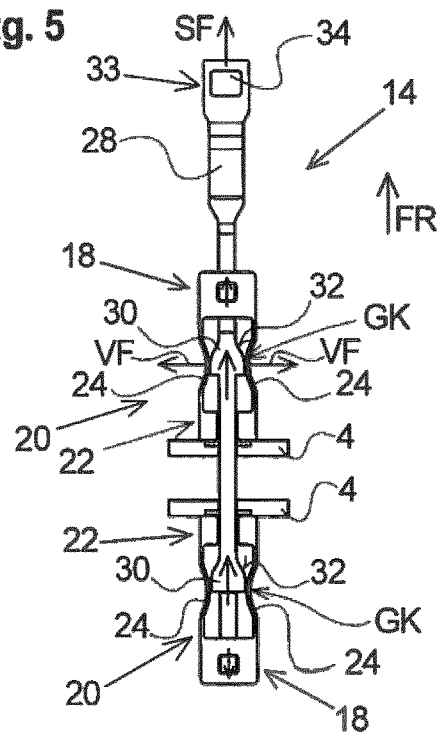

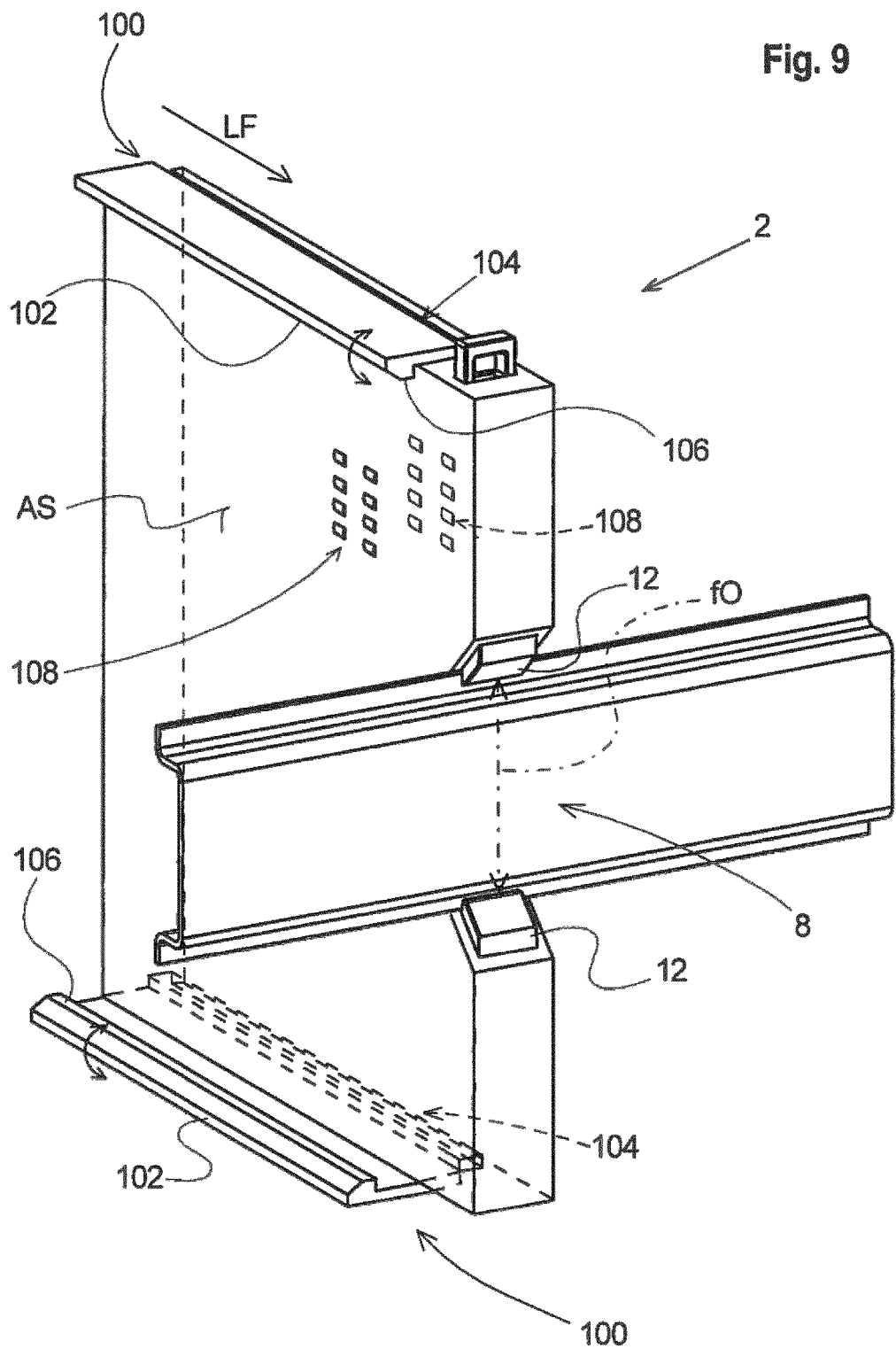

STACKABLE MODULE

The invention concerns a stackable module, such as an electric or electronic switching or control unit, according to the generic part of claim 1. This stackable module has a housing provided to receive an electric/electronic component and clip-on clamping device used to attach the module to a support rail. The support rail may be a top-hat rail to take an array of several modules, wherein the modules may each have means for electrically contacting neighbouring modules. For this, the clamping device has two latching/gripping hooks, which are displaceable in mutually opposite directions between an open position and a fastening position. Moreover, there is a force deflection mechanism to adjust the latching/gripping hooks between the open position and the fastening position, that is actuable by means of an actuating element, and able to be subjected to an actuating force from an outer side. In this case, the latching/gripping hooks bound a free opening distance which, for release fastening to the support rail, is greater in the open position and smaller in the fastening position than a support rail extent on the support rail provided for fastening. As a result, the latching/gripping hooks can be suitable latched or engaged to a support rail of the appropriate size.

Such stackable modules enable simple mounting on the relevant support rail in a straight direction of movement without tipping, for example when creating an array of several modules of a switching cabinet. If one of these modules is to be removed or replaced again, the force deflection mechanism is subjected to an actuating force from an outer side that opens the latching/gripping hooks. In this, the free opening distance between the latching/gripping hook is big enough to be able to remove the module from the support rail along a straight direction of movement and without tipping.

US 2007/008708 A1 reveals a stackable module with a housing provided to hold an electric/electronic component and with a clamping device for attaching to a support rail. The clamping device has two latching/gripping hooks, which are displaceable in mutually opposite directions between an open position and a fastening position for adjusting the latching/gripping hooks between the open position and the fastening position. This mechanism is then actuable by means of an actuating element that can be subjected to an actuating force from an outer side.

A stackable device is known from DE 197 09 811 A1 that can be attached to a support rail by means of two support sliders. By means of a release lever provided on the upper side, the support sliders can be moved from a support position to a free position to be able to remove the device attached to the support rail. The release lever is connected to the two support sliders via a force deflection mechanism with several links that are connected via film hinges and form a double knee joint.

DE 600 32 595 T2 shows a fastening device to attach modules to a rail, in which the two gripper hooks are formed on one slider each, which are pre-stressed in a gripping position by means of coil springs. To be able to move both gripper hooks into an open position, an elliptical profile is formed on a twistable actuating element that comes into contact with both sliders. By moving the long cross section of the elliptical profile between the two sliders they are moved to the open position against the force of the coil springs, in which the fastening device can be removed from the rail.

EP 1 672 743 B1 describes a fastening device for attaching a module to a top-hat rail in which an upper gripping hook is formed in a single piece with an actuating element that can be moved in a linear direction. Moreover, one actuating arm for each of two pivoting lower hook elements is hinged on the actuating element. By pulling on the actuating element, the upper gripper hook can thus be moved up and the lower hook elements pivoted down to move the fastening device into the open position.

EP 1 742 315 A1 shows a module housing to snap on a support rail, in which a single-piece gripper device is provided, comprising two sliders, between which a spring element takes effect. The spring element pre-stresses the two sliders, which serve to engage behind the support rail, against each other in a gripper position. By twisting an expanding pin, which has an elliptical profile in a gap of the gripper device, the two sliders can be moved to an open position against the spring force, in which the module housing can be removed from the support rail.

What is disadvantageous about the known stackable devices is that their force deflection mechanism often develops a defect after repeated actuation and/or after a long service life and the clamping devices can only be removed from the support rail with difficulty, if at all.

It is the purpose of the invention to avoid the above-mentioned disadvantages with a stackable module of this kind and to ensure trouble-free function of the clamping device over a long service life.

This task is solved by a stackable device with the features of claim 1. In this connection, the force deflection mechanism has an actuating-element-side deflection profile and a hook-side displacement part, which has a deformation portion which is deformable by a displacement force, wherein between the deflection profile and the deformation portion, a sliding contact is or is able to be formed. At this sliding contact, the deformation portion can be directly subjected to the displacement force via the deflection profile. The displacement force generates a deformation or stretching of the deformation portion, wherein the latching/gripping hook concerned is moved. As a result, depending on the relevant movement path of the actuating element, an exactly executed hook-side displacement is possible, the length of which is predefined. The direct application of force from the deflection profile onto the deformation portion ensures reliable functioning of the force deflection mechanism and the clamping device as a whole over a long service life. By transmitting the deflection force from the actuation element side to the latching/gripping hook side via the sliding contact, the parts concerned can be manufactured separately from each other and thus shaped depending on their relevant function and the mechanical load to be expected. In particular, the actuating-element-side deflection profile and the hook-side displacement part can be sized independently of each other and/or manufactured from different materials. In this way, the individual parts of a force deflection mechanism can be formed so that trouble-free clamping and releasing of the stackable module can be guaranteed over an intended service life. Moreover, the intended sliding contacts enable a particularly simple fitting of the clamping device overall.

Here, it is beneficial if the deformation portion is located between a bearing section and a movement section, connected to the latching/gripping hook, of the displacement part. As a result, the displacement part can be hold in a stable position via the bearing section, for example on the module housing, while the movement section can be moved via the deformation portion. This can prevent unwanted winding of the displacement part during the adjustment of the movement section.

Positively, the movement section is linearly guided, which enables a fast and stable change for the open position to the fastening position and vice versa.

It is also positive if the deformation portion is formed by deformation elements arranged in pairs, the distance between which can be changed by the deflection profile. Thanks to this arrangement of the deformation elements in pairs, the movement section can be held and maintained particularly stable in comparison to the bearing section. For example, the deformation elements are formed by two elastic spring elements with convex contact surfaces facing each other that can be splayed apart using the deflection profile. In this way, a force deflection mechanism that works particularly robustly and can be manufactured particularly cheaply can be made available.

It is always beneficial if the force deflection mechanism has two actuation-element-side deflection profiles, which each interact with a hook-side displacement part, wherein they can be subjected to deformation forces opposite each other via the relevant sliding contact. In this way, it is possible to move the hook-side displacement parts or the latching/gripping hooks connected to them via the force deflection mechanism, in opposite directions at the same time to reduce or increase the opening spacing. In this connection, it is advantageous if the force deflection mechanism is pre-stressed in the fastening position in order to ensure stable fastening of the module after attaching to the support rail concerned.

The hook-side deformation parts are preferably formed in a single piece with the assigned latching/gripping hooks, which ensures a direct transmission of force and thus enables an especially stable attachment to the support rail concerned. In this connection, it is good if the force deflection mechanism is pre-stressed by a spring device that is formed in a single piece with the actuating element or the two displacement parts and is supported on the housing. As a result, the force deflection mechanism and the clamping device can be manufactured cheaply overall and from just a few parts and fitted especially simply.

In a particularly beneficial version, contact slopes opposite each other are formed on the latching/gripping hooks, via which the latching/gripping hooks can be spread by pressing them against the support rail counter to the pre-stressing of the fastening position in the open position. As a result, the clamping device can be moved to the open position simply by pressing the latching/gripping hooks arranged in the fastening position into the open position and the module is thus especially conveniently fastened on the support along a straight movement direction and without tipping.

Moreover, it is preferable if the hook-side displacement part is retained on the housing in particular to ensure stable guidance of the hook-side deformation portion when the module is pressed against the support rail.

Furthermore, it is good if the actuating element has an operating section that protrudes from the upper side of the housing at least in the fastening position. As a result, the actuating element can be easily accessed on the support rail, even when the module is fastened to move the latching/gripping hooks in the open position and thus to be able to release the module from the support rail again.

Preferably, the actuating element can be moved along a linear guidance direction by means of an actuating force to be applied on the operating section. This enables simple actuation of the force deflection mechanism by applying traction or pressure.

Alternatively, the actuation element can be twisted around an axis by applying torque to the operating section. The twistable version of the actuation element allows a particularly convenient switching from the fastening position to the open position and a particularly compact structure of the clamping device.

In a particularly beneficial version of the stackable module, linear guide means are provided on the housing by means of which a linear guide vertical to the clamping device or to the opening gap of the latching/gripping hooks can be created. As a result, it is possible, for example, to conduct a second module along a module that has already been fastened in such a way that it can be put on the relevant top-hat rail in an exactly vertical direction.

For this, the guide means preferably have a guide profile extending along a linear guide direction and a guide holder extending along the linear guide direction. The size and shape of the guide holder is designed so that it serves to receive the guide profile of another module in a guiding way. As a result, each one of the stackable modules can be formed simply so that it can be securely guided while being attached and, when it has been attached, it can act as a secure guide.

It is particularly beneficial if the guide profile has a guide edge which can be flexibly moved vertical to the linear guide direction. As a result, the guide means can also act as latching means at the same time, which enables latching of two neighbouring modules vertical to the linear guide direction. As a result, two modules already retained on a top-hat rail, for example, can be latched with each other by pressing their sides together.

Preferably, there are two guide profiles and guide holders arranged in pairs on the housing, wherein a particularly exact linear guidance or a particularly stable latching connection between the modules concerned is possible.

It must be pointed out that all of the features of the object according to the invention described above can be replaced or combined with each other singly or in combination provided that replacement or combination of the same is not ruled out for technical reasons.

Figure 6A:
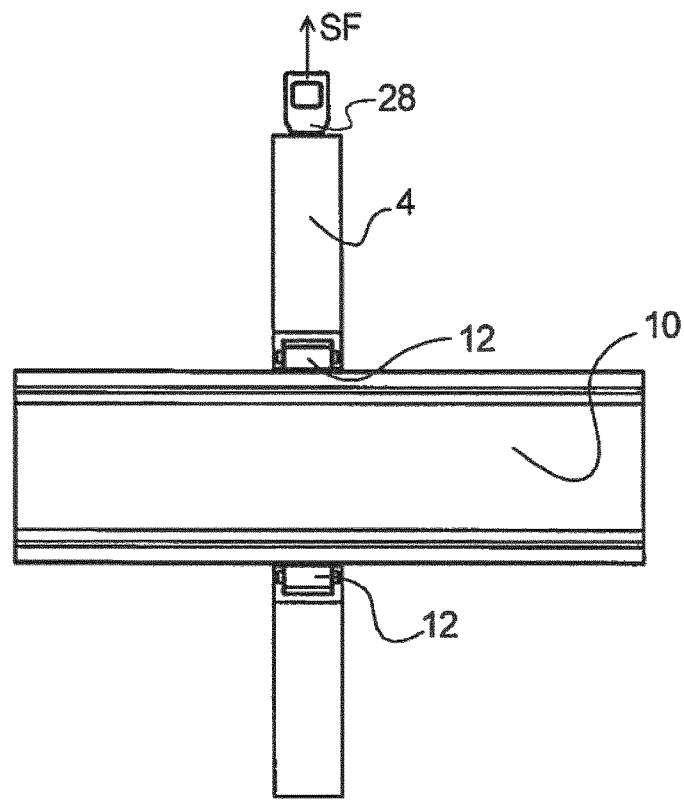
Figure 6B:
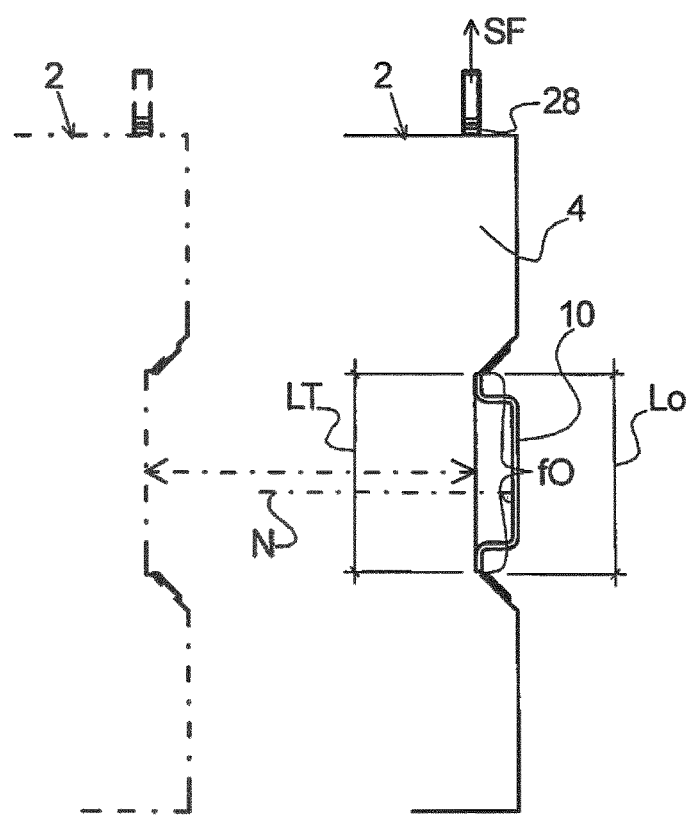
Figure 7A:
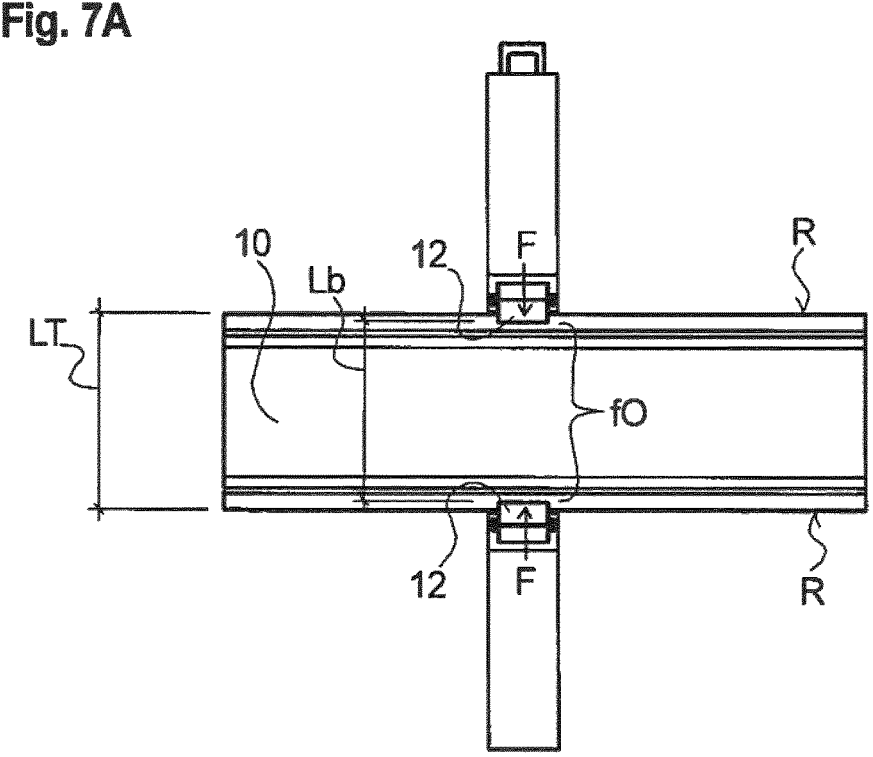
Figure 7B:
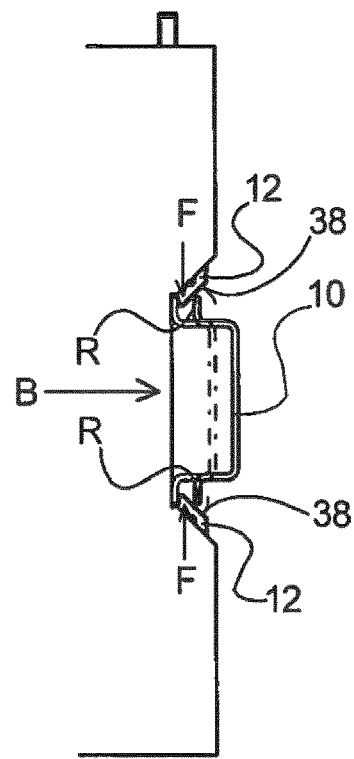
Figure 8:
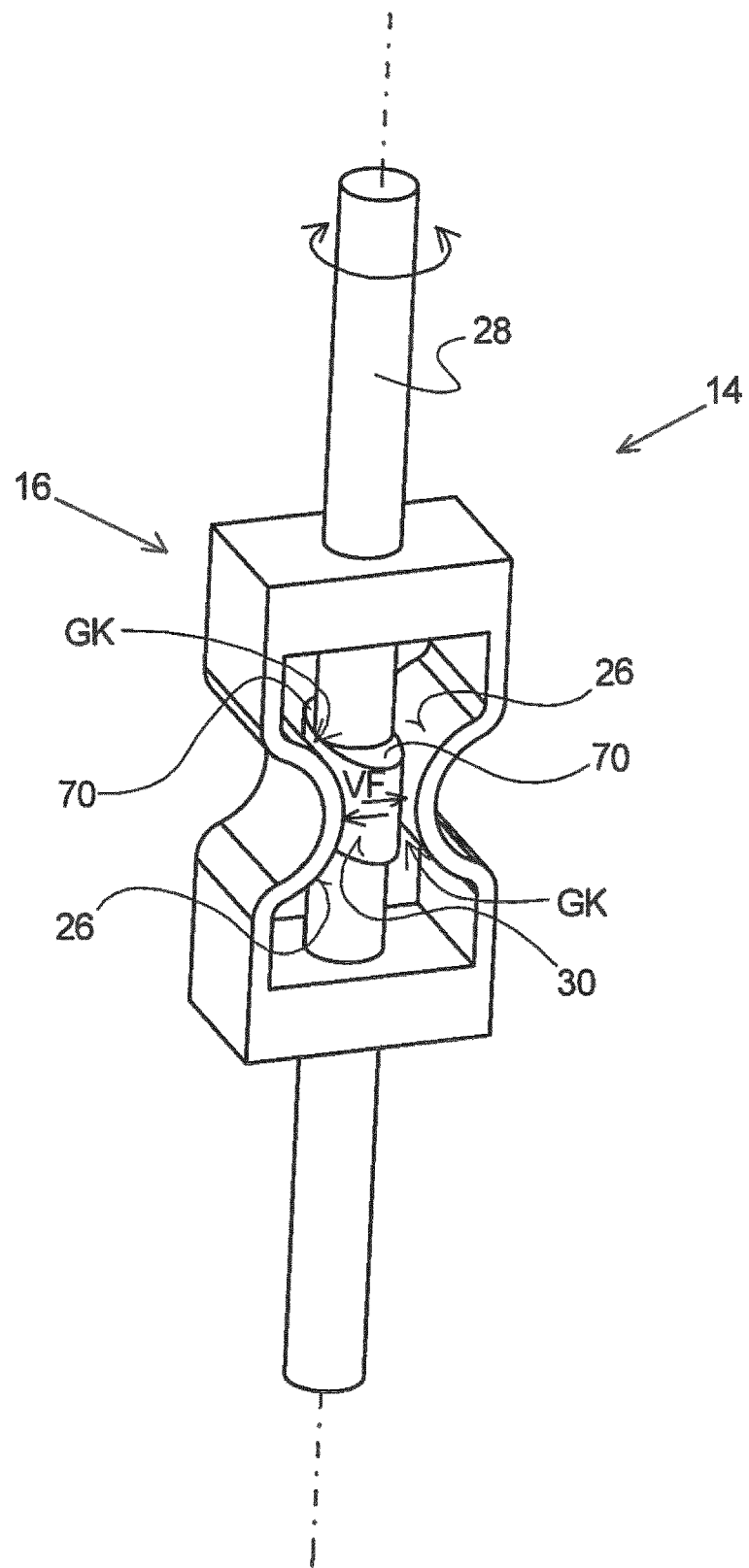
Figure 10A:
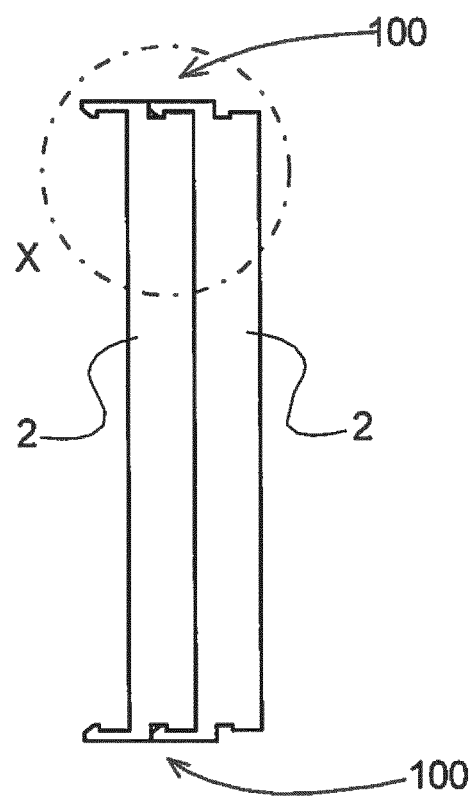
Figure 10B:
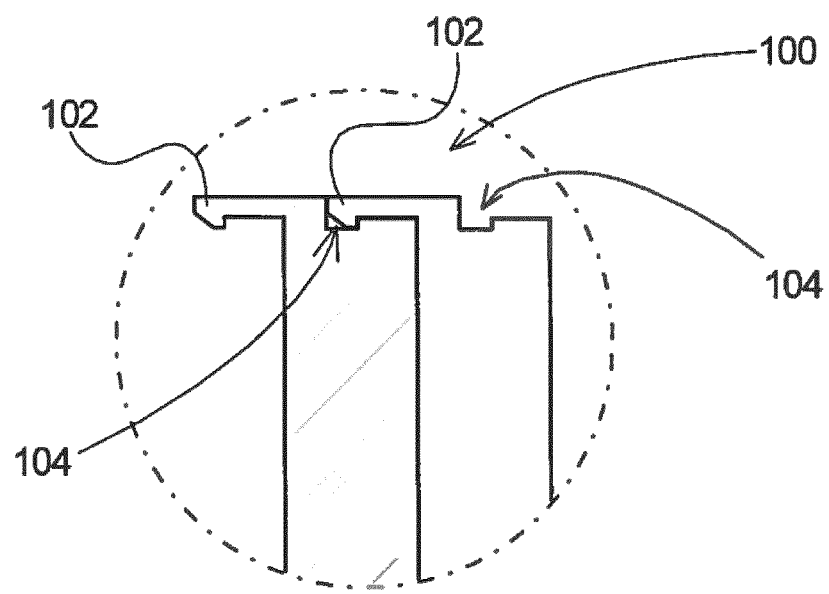
Figure 11A:
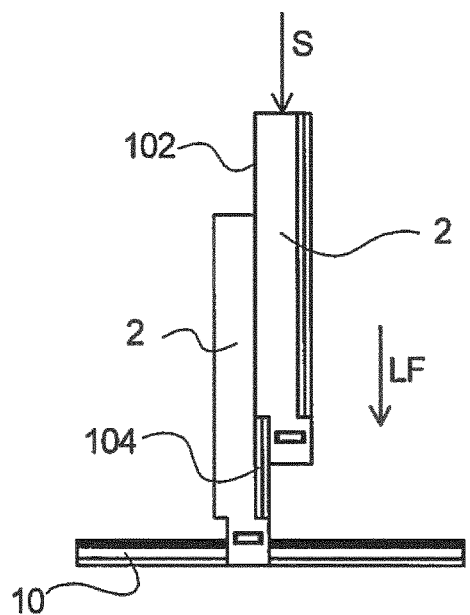
Figure 11B:
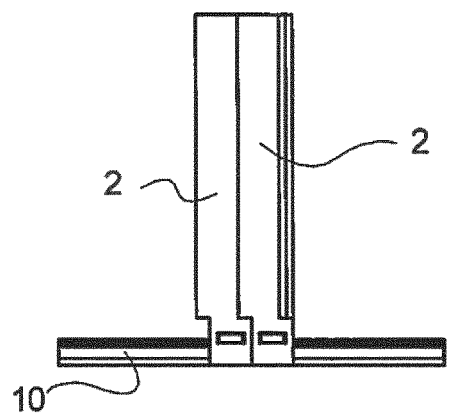
Figure 12A:
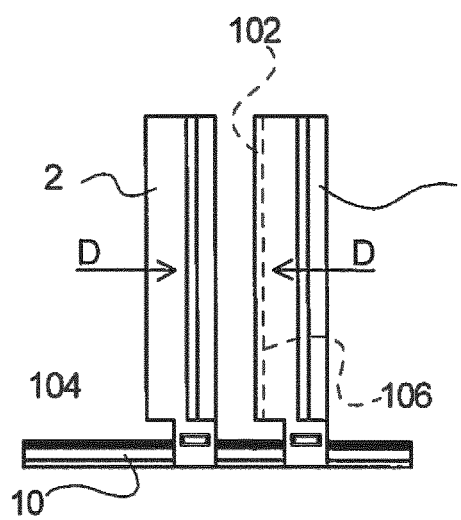
Figure 12B:
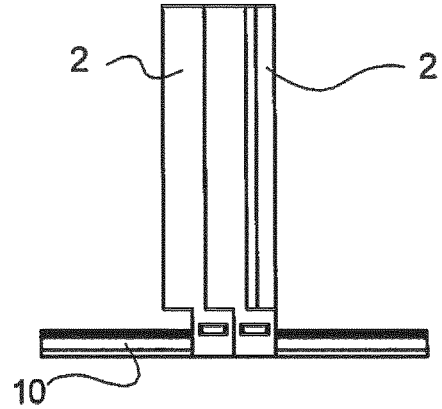

The Figures show an exemplary version of the invention. They show:

FIG. 1 a perspective view of a stackable module according to the invention in a fastening position, FIG. 2 a perspective view of a front of a force deflection mechanism of the stackable module according to FIG. 1, FIG. 3 a perspective view of a back of the force deflection mechanism according to FIG. 2, FIG. 4 a top view of the back of the force deflection mechanism according to FIG. 3 in the fastening position, FIG. 5 a top view of the back of the force deflection mechanism according to FIG. 3 in an open position, FIG. 6A a front view of the stackable module according to FIG. 1 when being released from a support rail, FIG. 6B. a side view of the stackable module according to FIG. 6A, FIG. 7A a front view of the stackable module in the mounted state on the support rail FIG. 7B. a side view of the stackable module according to FIG. 7A, FIG. 8 a perspective view of an alternative version of the force deflection mechanism with a twistable actuating element, FIG. 9 a perspective view of another alternative version of the stackable module with linear guide means, FIG. 10A a cross section through a housing of the module according to FIG. 9 at the height of the linear guide means, FIG. 10B a magnified view of the detail X from FIG. 10A, FIG. 11A a top view of two modules guided next each other according to FIG. 9, FIG. 11B a top view of the modules according to FIG. 11A in a fully mounted state, FIG. 12A a top view of two modules according to FIG. 9 in a fixed but separate state and FIG. 12B a top view of the modules according to FIG. 12A in a latched state.

FIG. 1 shows a stackable module 2 in the form of an electric or electronic switching or control unit. It has a housing 4 in which at least one electric/electronic component 6 is housed. In addition, a clamping device 8 is provided on the housing 4 that will be used to fasten the module 2 to a support rail 10. The clamping device 8 is shaped so that the module 2 can be fastened to a certain standard commercially available model of support rail 10, which is in the shape of a "top-hat rail", for example.

The clamping device 8 has two latching/gripping hooks 12 for this, with which the support rail 10 can be encompassed by two edges R facing away from each other. The latching/gripping hooks 12 can be moved from a fastening position, as shown in FIG. 1, by means of a force deflection mechanism 14 into an open position and vice versa.

In this connection, the force deflection mechanism 14 has, as can be seen in particular in FIGS. 2 and 3, two hook-side displacement parts 16 on each of which one of the latching/gripping hooks 12 is provided. In this connection, the displacement parts 16 can be formed in a single piece with the relevant latching/gripping hook 12, for example, or alternatively, have a stable connection. The latching/gripping hook 12 is always connected to a movement section 18 of the displacement part 16, which is retained in a bearing section 22 of the displacement part 16 by means of a deformation portion 20. The bearing sections 22 are each fixed to the housing 4 or a part permanently connected to the housing 4, whereas the movement sections 18 can be moved and guided in a linear fashion via the housing 4.

The deformation portion 20 has two bow-shaped spring elements 24, which form two convex contact surfaces 26 facing each other, as can be seen in particular from FIGS. 4 and 5.

Moreover, the force deflection mechanism 14 has a long actuating element 28 on which two actuating-element-side deflection profiles 30 are provided that each interact with a pair of the spring elements 24. For this, the deflection profiles 30 each form a contour 32 that tapers in longitudinal direction of the actuating element 28, both sides of which can be brought into sliding contact (GK) with the relevant convex contact surfaces 26 of the hook-side displacement parts 16.

Furthermore, an operating section 33 is provided at one end of the actuating element 28, in which an engaging recess 34 has been inset on which a suitable tool, such as a screwdriver for example, can be engaged. For this, in the mounted state of the actuating element 28 the operating section 33 of the actuating element 28 protrudes from one upper side 35 of the housing 4 (see FIG. 1).

Via the operating section 33, the actuating element 34 can be moved by applying an actuation force SF along a guide direction FR predefined by the housing 4. As shown in FIG. 5, the largely wedge-shaped contour 32 of the actuating-element-side deflection profile 30 moves between the two spring elements 24 of the relevant deformation portion 20, wherein the spring elements 24 are increasingly spread out as a consequence of the sliding contact GK with the wedge-shaped contour 32 of the deflection profiles 30.

Since the bearing sections 22 of the two displacement parts 16 are fixed to the housing 4, the movement section 18 is moved away in a linear way from the associated bearing section 22 due to the increasing gaps between the spring elements 24, wherein the latching/gripping hooks 12 retained on the movement sections 18 are also moved away from each other in the open position, as shown in FIG. 6A.

Here, as can be seen from FIG. 6B, the latching/gripping hooks 12 limit a free opening gap fO, which has a length Lo in the open position, which is slightly bigger than a stretch LT of the support rail 10. As a result, the module 2, in the open position of clamping device 8 in a straight direction along a normal N to the support rail 10, can be removed from it or placed on it, as shown in FIG. 6B.

If the actuating element 28 is not subjected to actuation force SF, the latching/gripping hooks 10 are held by contrast in the fastening position as a consequence of a spring force F according to FIG. 7A, in which the free opening gap fO has a length Lb that is smaller than the stretch LT of the support rail 10. When the module 2 is mounted on the support rail 10 according to FIG. 7A, this results in the latching/gripping hooks 12 encompassing the edges R in the fastening position and the module 2 is thus firmly clamped to the support rail 10.

The spring force F is thus generated on both latching/gripping hooks 12 by means of a relevant spring device 36 that, according to FIG. 1, is arranged between the housing 4 or a part permanently fixed to it and the relevant latching/gripping hook 12 and pre-stresses it towards the fastening position.

Moreover, the module 2 can also be fixed to the support rail 10 without subjecting the actuating element 28 to force, via the operating section 33. For this, the clamping device 8 according to FIG. 7B is placed on the support rail 10 in such a way that the latching/gripping hooks 12 are in contact with a contact slope 38 shaped by them on one of the edges R. By subsequently applying pressure with contact pressure B that is sufficient to overcome the spring force F of the spring devices 36 exerted on the latching/gripping hooks 12 via the contact slopes 38, the latching/gripping hooks 12 can be pressed into the open position against the pre-stressing. The latching/gripping hooks 12 can thus pass the edges R of support rail 10 to then engage behind it as a consequence of the restoring forces of the spring devices 36. In this way, attaching of the module 2 by pressing it straight along the normal direction N on the support rail 10 is possible without using tools.

As shown in FIG. 8, the force deflection mechanism 14 in another version of the clamping device 8 has an axis-shaped actuating element 28, on which the actuating-element-side deflection profile 30 is formed by two eccentric cams 70 facing away from each other. By twisting the actuating element 28, the eccentric cams 70 can be brought into sliding contact GK with two contact surfaces 26 of a hook-side displacement part 16 in line with the version according to FIGS. 2 to 5 so that they are spread apart by the displacement force VF and the latching/gripping hooks 12 (not shown) held on the displacement part 16 are thus moved to the open position or the fastening position.

Apart from the twistable version of the actuating element 28, the functioning of such a force deflection mechanism corresponds to the functioning of the version according to FIGS. 6 and 7.

In the versions of the module 2 according to FIG. 1 to 7 or 8, a development of the force deflection mechanism 14 cold be provided by means of which it could be moved from the fastening position to the open position (not shown) by applying pressure to the actuating element 28 as an alternative to the functioning shown.

FIG. 9 shows another version of the stackable module 2 with provision for linear guide means 100 on the housing 4. By means of these linear guide means 100, a mutual movement of two modules 2 along a linear guide direction LF is possible that is vertical to the clamping device 8 or the opening gap 11 between the two latching/gripping hooks 12.

For this, the linear guide means 100 have guide profiles 102 arranged in pairs that each stretch along the linear guide direction LF. Moreover, on one of the sides of the housing 42 facing away from the guide profiles 102, guide holders 104 arranged in pairs are provided. These guide holders 104 are sized and shaped so that they can guide and accept the guide profiles 102 of another stackable module 2, as shown in FIGS. 10A and 10B.

In this connection, the guide profiles 102 can be formed so that they have a guide edge 106 that is flexibly pivotable vertically to the linear guide direction LF (see FIG. 9).

As shown in FIG. 11 A, a first module 2 can thus be pushed onto the back of a second module 2 that is already fastened to a support rail 10, for example, as shown by arrow S. In this connection, the guide profiles 2 of the loose module 2 engage with the guide holders 104 of the fastened module 2 and are guided by them exactly in the linear guide direction LR and vertical to support rail 10. The loose module 2 is then moved so far in linear guide direction LF until the clamping device 8 of loose module 2 clamps tightly to the support rail 10, as shown in FIG. 11B.

If the guide profiles 102 are formed with a flexibly pivotable guide edge 106, it is also possible to engage two of the stackable modules 2 with each other before or after they are fastened to the support rail 10, as shown in FIGS. 12A, 12B. For this, the two modules 2 are pressed against each other from the sides, as shown by the arrow D in FIG. 12 A. As soon as the guide profiles 102 concerned of the one module 2 come into contact with the housing 4 of the other module 2, they are spread apart and then latch into the relevant guide holder 104 of the other module 2. According to this, the modules 2 then take up the completely mounted position according to FIG. 12B.

To ensure electric/electronic contact between the two modules 2 in both of the mounting processes described above, they can have contact means 108 on both contact sides AS of the housing 4, which may have spring bearings. As a result, the electric/electronic contact between the two modules 2 can be established both in the linear guide direction LF and vertically.

It must be pointed out that all of the elements and features of the various versions according to the invention described above can be replaced or combined singly or in combination provided that replacement or combination of the same is not ruled out for technical reasons.

The invention claimed is:

1. A stackable module with a housing provided to hold an electric/electronic component and with a clamping device for attaching to a support rail,
wherein the clamping device has two latching/gripping hooks, which are displaceable in mutually opposite directions between an open position and a fastening position,
and a force deflection mechanism to adjust the latching/gripping hooks between the open position and the fastening position, that is actuable by means of an actuating element, and able to be subjected to an actuating force from an outer side,
wherein the latching/gripping hooks bound a free opening distance which, for release fastening to the support rail, is greater in the open position and smaller in the fastening position than a provided support rail extent, and
wherein the force deflection mechanism has an actuating-element-side deflection profile and a hook-side displacement part, which has a deformation portion which is deformable by a displacement force in order to generate a hook-side displacement, wherein between the deflection profile and the deformation portion, a sliding contact is able to be formed, at which the deformation portion is able to be subjected to the displacement force via the deflection profile.

2. The module according to claim 1, wherein the deformation portion is provided between a bearing section and a movement section of the displacement part connected to the latching/gripping hook.

3. The module according to claim 2, wherein the movement section is linearly guided.

4. The module according to claim 3, wherein the deformation portion is formed by deformation elements arranged in pairs, the distance between which can be changed by the deflection profile.

5. The module according to claim 3, wherein the force deflection mechanism has two actuating-element-side deflection profiles, which each interact with a hook-side displacement part, wherein they can be subjected to deformation forces opposite each other via the relevant sliding contact.

6. The module according to claim 2, wherein the force deflection mechanism has two actuating-element-side deflection profiles, which each interact with a hook-side displacement part, wherein they can be subjected to deformation forces opposite each other via the relevant sliding contact.

7. The module according to claim 2, wherein the deformation portion is formed by deformation elements arranged in pairs, the distance between which can be changed by the deflection profile.

8. The module according to claim 1, wherein the deformation portion is formed by deformation elements arranged in pairs, the distance between which can be changed by the deflection profile.

9. The module according to claim 8, wherein the force deflection mechanism has two actuating-element-side deflection profiles, which each interact with a hook-side displacement part, wherein they can be subjected to deformation forces opposite each other via the relevant sliding contact.

10. The module according to claim 1, wherein the force deflection mechanism has two actuating-element-side deflection profiles, which each interact with a hook-side displacement part, and
wherein the two actuating-element-side deflection profiles are subjected to deformation forces opposite each other via sliding contact.

11. The module according to claim 10, wherein the hook-side displacement parts are each formed in a single piece with the relevant latching/gripping hook.

12. The module according to claim 10, wherein, contact slopes opposite each other are formed on the latching/gripping hooks, via which the latching/gripping hooks can be spread by pressing them against the support rail counter to the pre-stressing of the fastening position in the open position.

13. The module according to claim 1, wherein the hook-side displacement parts is located on the housing.

14. The module according to claim 1, wherein the actuating element has an operating section that protrudes from the upper side of the housing at least in the fastening position.

15. The module according to claim 14, wherein the actuating element can be moved along a linear guide direction due to the actuating force that can be applied along the operating section.

16. The module according to claim 1, wherein linear guide means are provided on the housing, by means of which a linear guide vertical to the opening distance of the latching/gripping hooks can be generated.

17. The module according to claim 16, wherein the guide means have a guide profile extending along a linear guide direction and a guide holder extending along the linear guide direction, which is formed for the guided housing of the guide profile of another module, which has matching guide means.

18. The module according to claim 17, wherein the guide profile has a flexibly moving guide edge vertical to the linear guide direction.

19. The module according to claim 17, wherein two guide profiles and guide holders arranged in pairs are provided on the housing.

20. A stackable module with a housing provided to hold an electric/electronic component and with a clamping device for attaching to a support rail,
   wherein the clamping device has two latching/gripping hooks, which are displaceable in mutually opposite directions between an open position and a fastening position,
   and a force deflection mechanism to adjust the latching/gripping hooks between the open position and the fastening position, that is actuable by means of an actuating element, and able to be subjected to an actuating force from an outer side,
   wherein the latching/gripping hooks bound a free opening distance which, for release fastening to the support rail, is greater in the open position and smaller in the fastening position than a provided support rail extent, and
   wherein the force deflection mechanism has an actuating-element-side deflection profile and a hook-side displacement part, which has a deformation portion which is deformable by a displacement force in order to generate a hook-side displacement, wherein between the deflection profile and the deformation portion, a sliding contact is able to be formed, at which the deformation portion is able to be subjected to the displacement force via the deflection profile, and
   wherein the actuating element can be twisted around the axis by a torque to be applied on the operating section.

21. A stackable module, comprising:
   a housing provided to hold a component; and
   a clamp for attaching the housing to a support rail, the clamp comprising:
     a latching hook displaceable in a linear direction between an open position and a fastening position, the latching hook extending into a recess in the housing;
     a bow spring connected to the latching hook, the bow spring having two inwardly curved sides separated by a first distance; and
     an actuator extending through the bow spring, the actuator having an enlarged section, a width of the enlarged section being greater than the first distance,
   wherein movement of the actuator forces the enlarged section against the curved sides of the bow spring to increase a length of the spring, and
   wherein the increase in the length of the spring moves the latching hook from the fastening position to the open position.

* * * * *